(12) United States Patent
King et al.

(10) Patent No.: US 12,459,739 B2
(45) Date of Patent: Nov. 4, 2025

(54) AUTOMATED TRANSPORTER FLEET CONTROL IN ORDER FULFILLMENT FACILITIES

(71) Applicant: FETCH ROBOTICS, INC., Lincolnshire, IL (US)

(72) Inventors: Derek King, Seattle, WA (US); Sarah Elliott, San Jose, CA (US); Steffen Fuchs, San Jose, CA (US); Charles Raimbert, San Diego, CA (US); David J. Robson, San Jose, CA (US); Steve Hunt, Port Hueneme, CA (US); Brendan Clune, Longmont, CO (US); Paul Villers, Walnut Creek, CA (US); Jenna Guergah, Santa Cruz, CA (US); Annelise Pruitt, San Jose, CA (US); Melonee Wise, San Jose, CA (US)

(73) Assignee: Zebra Technologies Corporation, Lincolnshire, IL (US)

( * ) Notice: Subject to any disclaimer, the term of this patent is extended or adjusted under 35 U.S.C. 154(b) by 796 days.

(21) Appl. No.: 17/856,705

(22) Filed: Jul. 1, 2022

(65) Prior Publication Data

US 2022/0411188 A1    Dec. 29, 2022

(51) Int. Cl.
*G06F 7/00* (2006.01)
*B65G 1/137* (2006.01)
(Continued)

(52) U.S. Cl.
CPC ......... *B65G 1/1373* (2013.01); *G05D 1/0217* (2013.01); *G05D 1/0291* (2013.01); *G06Q 10/087* (2013.01); *B65G 2209/02* (2013.01)

(58) Field of Classification Search
CPC .............. B65G 1/1373; B65G 2209/02; B65G 2209/06; B65G 1/1375; B65G 1/00;
(Continued)

(56) References Cited

U.S. PATENT DOCUMENTS 10,908,601 B2    2/2021  Diehr et al.
2001/0051079 A1  12/2001 Arai
(Continued)

OTHER PUBLICATIONS

International Search Report and Written Opinion for International Application No. PCT/US2022/036008 mailed on Nov. 1, 2022.

*Primary Examiner* — Yolanda R Cumbess

(57) ABSTRACT

A method includes: obtaining a batch of item group definitions, each item group definition having one or more item identifiers and corresponding quantities; for each item identifier, retrieving (i) a location of a corresponding item in a facility, and (ii) a dimensional attribute of the corresponding item; based on the locations and dimensional attributes, assigning sets of the item group definitions to respective receptacle configurations, each receptacle configuration including, for each item group definition in the set, a receptacle type with a predefined capacity; monitoring availability of a plurality of transporters in the facility, each transporter having a chassis configured to support a selectable set of receptacles; and responsive to detecting that a transporter is available, selecting one of the receptacle configurations, and presenting the selected receptacle configuration via an output device, to initiate placement of receptacles onto the chassis of the transporter according to the selected receptacle configuration.

26 Claims, 10 Drawing Sheets

(51) Int. Cl.
  *G05D 1/00* (2006.01)
  *G06Q 10/087* (2023.01)

(58) Field of Classification Search
  CPC ............ B65G 2203/00; B65G 2209/00; G05D
          1/0217; G05D 1/0291; G05D 1/0287;
          G05D 1/0289; G05D 1/644; G06Q
          10/047; G06Q 10/06–0631; G06Q
          10/08–083; G06Q 10/087–0875
  USPC ................................. 700/213, 216, 223, 228
  See application file for complete search history.

(56) References Cited

U.S. PATENT DOCUMENTS

| | | | |
|---|---|---|---|
| 2007/0021863 A1 | 1/2007 | Mountz et al. | |
| 2013/0218799 A1 | 8/2013 | Lehmann et al. | |
| 2019/0300285 A1* | 10/2019 | Cheng | B65G 1/1373 |
| 2020/0198892 A1 | 6/2020 | Ahmann et al. | |
| 2021/0061566 A1* | 3/2021 | Cacioppo | B25J 9/162 |
| 2021/0158270 A1* | 5/2021 | Singh | G06Q 10/08 |

* cited by examiner

AUTOMATED TRANSPORTER FLEET CONTROL IN ORDER FULFILLMENT FACILITIES

CROSS-REFERENCE TO RELATED APPLICATIONS

This application claims priority to U.S. Provisional Patent Application No. 63/214,071, filed Jul. 6, 2021, the entire contents of which is incorporated herein by reference.

BACKGROUND

Item handling facilities (e.g. warehouses, shipping facilities and the like) may deploy systems that include various autonomous or semi-autonomous vehicles to assist in the handling of items, e.g., for order fulfillment. However, the variety of possible combinations of items to be handled, along with the varying physical characteristics and locations within the facility of such items, can lead to inefficient deployment of assets such as the above-mentioned autonomous or semi-autonomous vehicles.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
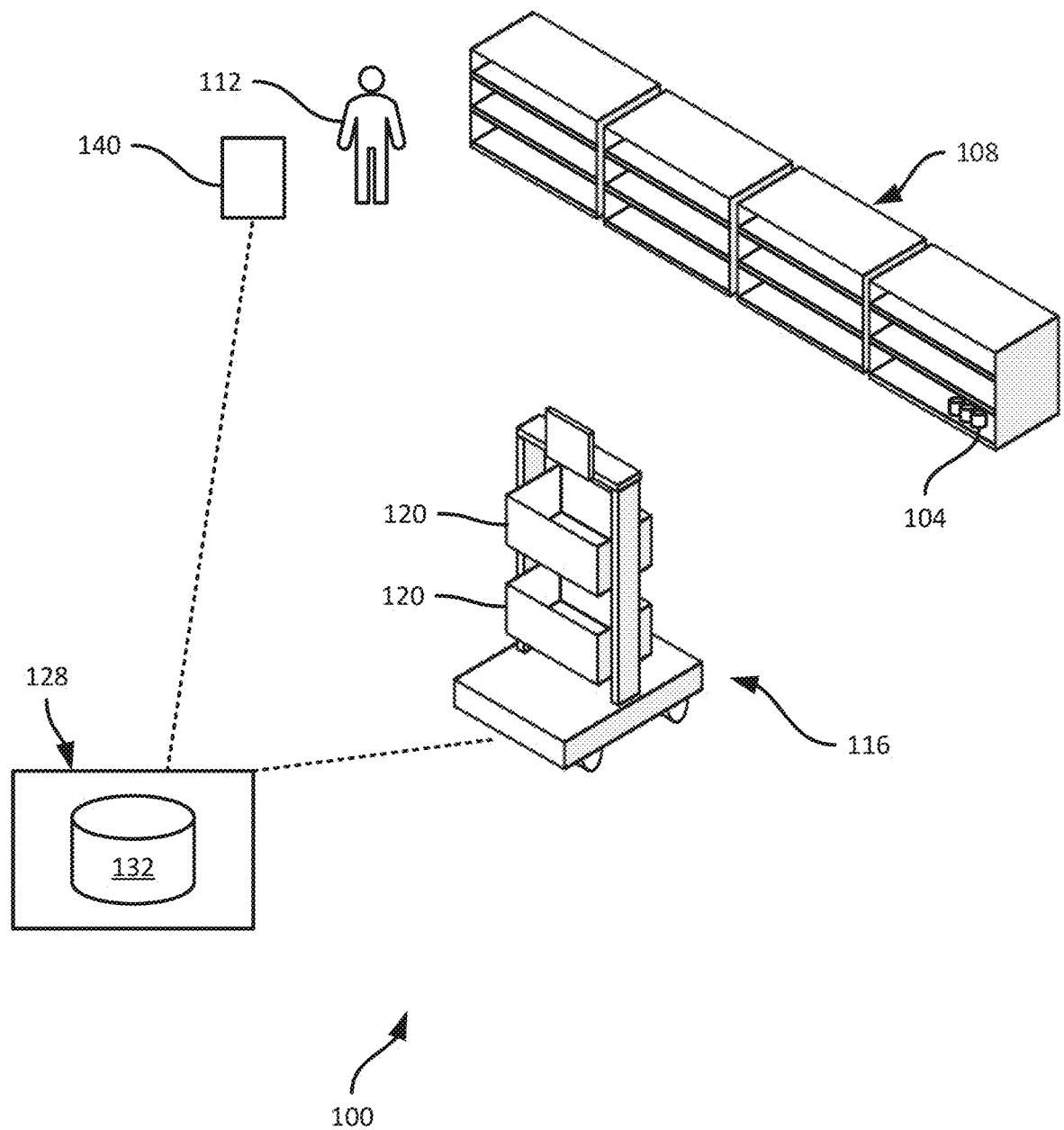
FIG. 1 is a diagram of an item handling facility containing a fleet control system.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a method, including: obtaining a batch of item group definitions, each item group definition having one or more item identifiers and corresponding quantities; for each item identifier, retrieving (i) a location of a corresponding item in a facility, and (ii) a dimensional attribute of the corresponding item; based on the locations and dimensional attributes, assigning sets of the item group definitions to respective receptacle configurations, each receptacle configuration including, for each item group definition in the set, a receptacle type with a predefined capacity; monitoring availability of a plurality of transporters in the facility, each transporter having a chassis configured to support a selectable set of receptacles; and responsive to detecting that a transporter is available, selecting one of the receptacle configurations, and presenting the selected receptacle configuration via an output device, to initiate placement of receptacles onto the chassis of the transporter according to the selected receptacle configuration.

Additional examples disclosed herein are directed to a computing device, comprising: a communications interface; a memory; and a processor configured to: obtain a batch of item group definitions, each item group definition having one or more item identifiers and corresponding quantities; for each item identifier, retrieve (i) a location of a corresponding item in a facility, and (ii) a dimensional attribute of the corresponding item; based on the locations and dimensional attributes, assign sets of the item group definitions to respective receptacle configurations, each receptacle configuration including, for each item group definition in the set, a receptacle type with a predefined capacity; monitor availability of a plurality of transporters in the facility, each transporter having a chassis configured to support a selectable set of receptacles; and responsive to detecting that a transporter is available, select one of the receptacle configurations, and present the selected receptacle configuration via an output device, to initiate placement of receptacles onto the chassis of the transporter according to the selected receptacle configuration.

FIG. 1 illustrates an item handling facility 100 or a portion thereof. The item handling facility can be a warehouse or other transport and logistics facility, a manufacturing facility, or the like. The nature of items handled in the facility 100 can vary widely. In some examples, the items include packages containing products to be transported to other facilities, customers (e.g., individuals having placed orders for the above-mentioned products), or the like. In other examples, the items include products received from manufacturers or other entities, or manufactured and/or assembled at the facility 100 itself, to be shipped to distribution centers and/or retailers. The facility 100 can also handle combinations of the above items. Items 104 received and/or produced at the facility 100 can be stored before processing, e.g., for delivery to retailers as noted above. The items 104 can, for example, be stored on support structures 108 such as shelving modules, racks, or other designated areas of the facility 100. The support structures can be arranged in various layouts, including in sets of aisles (e.g., each aisle being formed by contiguous sets of shelving modules), as will be apparent to those skilled in the art.

Processing the items 104 for delivery from the facility 100 as mentioned above therefore involves the retrieval of items 104 from the support structures 108, and transport of the retrieved items 104 to other areas of the facility 100, e.g. for packaging, loading onto vehicles for shipping, and the like.

For example, an order received at the facility 100 can specify a set of items to be retrieved for shipping to a given destination (e.g., items previously ordered by a given customer). In some facilities, to fulfill of such an order, a worker retrieves a cart or the like, and travels through the facility 100 to collect the specified items. Such an arrangement, however, may involve extensive travel by the worker.

In other facilities, as illustrated in FIG. 1, workers 112 are allocated to particular areas of the facility 100. Although one worker 112 is shown in FIG. 1, it will be understood that a plurality of workers 112 can be deployed throughout the facility 100, according to the number and arrangement of support structures 108 in the facility, the volume of items processed in the facility 100 (e.g., over the course of a given shift or other time period), and the like. Instead of traveling throughout the facility 100 to complete an order, each worker 112 picks items from support structures 108 within the specific area to which that worker 112 is assigned. Transport of items picked by one or more workers 112 is enabled by autonomous or semi-autonomous vehicles, also referred to as transporters 116, or mobile robots 116. To fulfill an order, a mobile robot 116 is dispatched to travel to locations corresponding to the items specified in the order. At each location, a worker 112 assigned to that location picks the relevant item(s) to the mobile robot 116. Over time, therefore, the mobile robot 116 collects items 104 corresponding to an order. When the complete set of items has been collected, the mobile robot 116 can be directed to a packout area, a shipping area, or other suitable location of the facility 100 for processing and shipment of the collected items 104.

As will be apparent to those skilled in the art, the number of orders to be fulfilled at the facility 100 during a given time period (e.g., one twenty-four hour day, one eight-hour shift, or the like) may significantly exceed the number of transporters 116 deployed in the facility 100. For example, a facility fulfilling thousands of orders in a given shift or other suitable time period may contain a comparatively small number of transporters 116, e.g., less than one hundred transporters 116.

To allocate the above orders among the available transporters 116 may therefore, in some systems, involve assigning an order to each transporter 116. As assigned orders are completed and transporters 116 become available (e.g., not currently handling an assigned order), further orders may be assigned to the transporters 116. Such a fulfillment process may, however, make inefficient use of the transporters 116, increasing the time consumed in fulfilling orders. For example, the transporters 116 may be capable of transporting substantially greater loads (e.g., in terms of volume, mass, or a combination thereof) than the orders generally received at the facility 100.

Some systems may therefore assign multiple orders to each transporter 116. Combining orders on a given transporter 116, however, may also lead to inefficient use of the transporters 116, e.g., by increasing the travel distance traversed by a given transporter 116 to complete assigned orders, and/or by complicating the task of separating combined orders at packout and/or shipping locations in the facility 100.

The facility 100 therefore includes certain components and related functionality to enable the fulfillment of orders by distributing the orders among a fleet of transporters 116, mitigating the above-noted complications of such distribution.

In particular, each transporter 116 includes a reconfigurable set of receptacles 120, which may have varying capacities (e.g., internal volumes, weight-bearing capacities, and the like). Although the two receptacles 120 shown in FIG. 1 have the same dimensions, other receptacles can be provided with different dimensions and/or other physical attributes. The receptacles 120 are removable from the transporter 116, such that the specific set of receptacles 120 carried by a given transporter 116 can be reconfigured over time. In particular, the receptacle set carried by each transporter 116 is reconfigurable to accommodate varying sets of item groups each containing one or more orders, while keeping the item groups separate from one another to simplify packout activities.

The facility 100 also includes a server 128, deployed in association with the facility 100. That is, the server 128 can be physically located at the facility 100, or located remotely from the facility 100 (e.g. in a distributed computing system or the like) and communicatively linked with one or more computing devices at the facility 100. The server 128, in combination with the transporter(s) 116, implements functionality described in detail below to assign combinations of orders to the transporters 116, and to provide guidance and/or control to either or both of the transporters 116 and the workers 112 for reconfiguring transporters 116, picking items to the transporters 116, and the like.

The server 128 stores, or accesses from one or more storage devices communicatively coupled with the server 128, a repository 132 containing various information used in implementing the functionality described herein. For example, the repository 132 can contain item identifiers corresponding to each item type in the facility 100. The repository 132 may also contain stock levels for each item type. For example, a record in the repository 132 can indicate that there are a given number of a particular item type in the facility, that item type having a particular identifier such as a universal product code (UPC). The repository 132 can also contain locations of each item type in the facility 100. For example, the stock of each item type may be stored at a designated location, such as a particular area, shelf module, or other location. The repository 132 can also contain dimensional attributes (which may also be referred to as physical attributes) for each item type in the facility, such as linear dimensions (e.g., length, width, depth), mass, volume, and the like.

The repository 132 can also contain data associated with the transporters 116, such as identifiers for each transporter 116, network addresses for the transporters 116, periodically updated locations within the facility 100 for each transporter 116, and the like. As will be seen below, the repository 132 can also contain fulfillment status data corresponding to each transporter 116, including an identifier of item groups currently assigned to the transporter 116 for collection in the facility 100, identifiers of receptacles 120 currently installed on the transporter 116, and the like.

As will be apparent in the discussion below, the server 128 can store or otherwise access various additional information, whether from the repository 132 or from other repositories. As will be apparent to those skilled in the art, the repository 132 itself can be divided into more than one distinct repository, each containing a portion of the information noted above.

Figure 2:
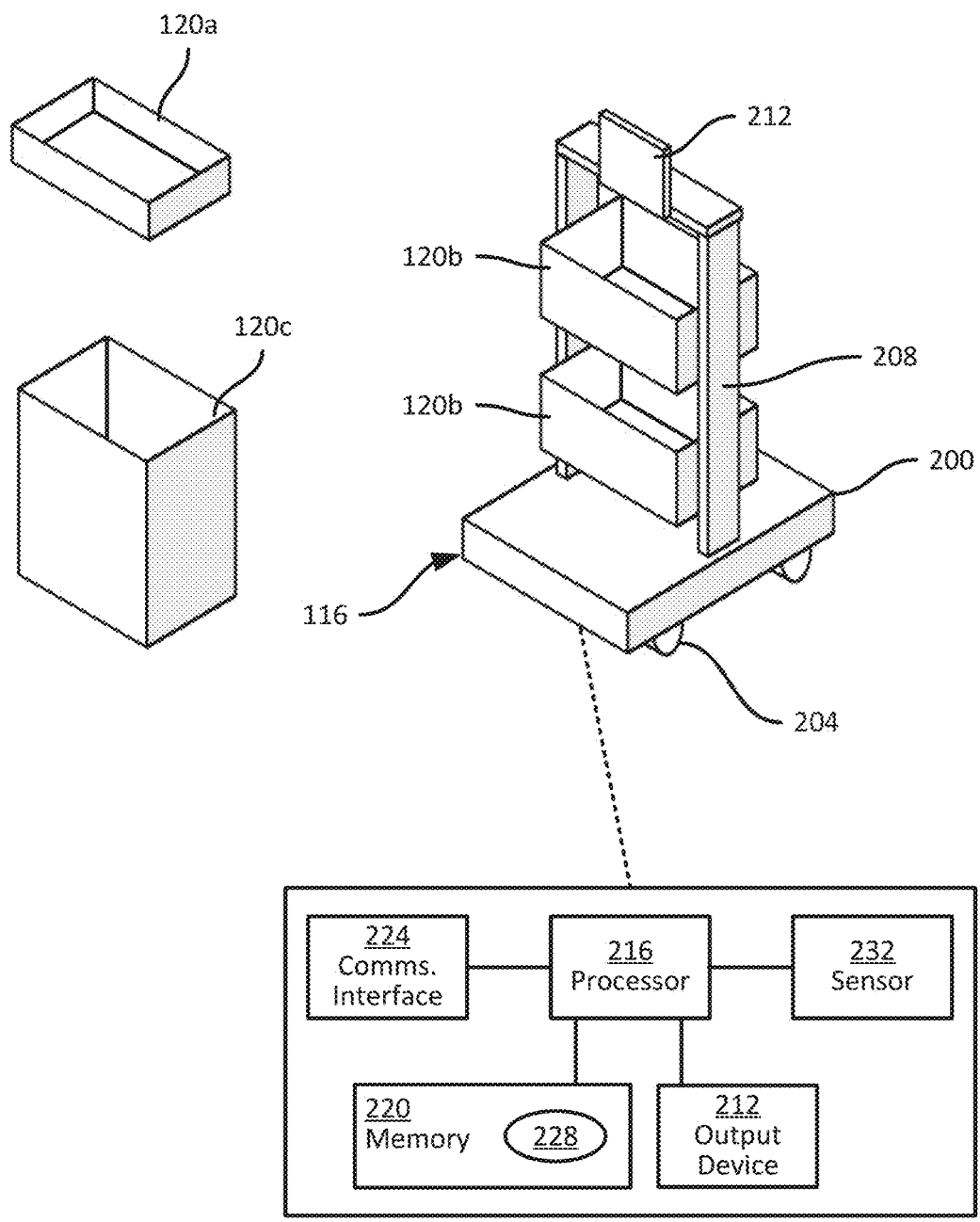
FIG. 2 is a diagram illustrating certain components of the transporter of FIG. 1.
Figure 3:
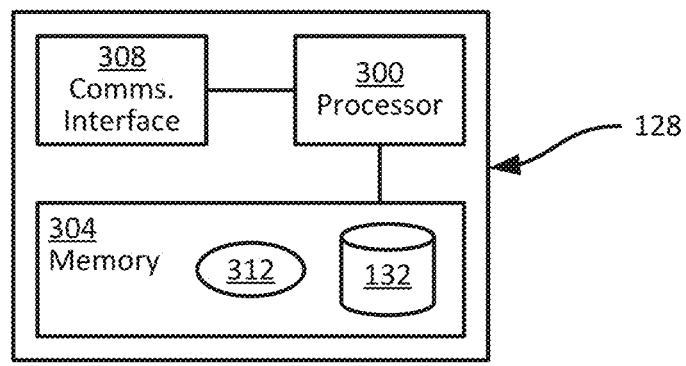
FIG. 3 is a diagram illustrating certain components of the server of FIG. 1.

Turning to FIG. 2 and FIG. 3, certain components of the transporter 116 and the server 128 will be discussed. As shown in FIG. 2, the transporter 116 includes a chassis 200 supporting various other components of the transporter 116. In particular, the chassis 200 supports a locomotive assembly 204, such as one or more electric motors or the like driving a set of wheels, tracks, or the like.

The chassis 200 is configured to support a selectable combination of receptacles 120. In the illustrated example, the chassis 200 supports a rack 208, e.g., including rails or other structural features configured to support receptacles 120 at variable heights above the chassis 200. The receptacles 120 can therefore be installed and removed to and from the rack 208, enabling distinct combinations of receptacles 120 to be supported by the transporter 116 at any given time. As will be discussed below in greater detail, the facility 100 can employ a plurality of distinct receptacle types, each with different capacities (e.g., in volume, mass, or both). Three example receptacle types are shown in FIG. 2, including a small receptacle 120*a*, a medium receptacle 120*b*, of which two are installed on the transporter 116, and a large receptacle 120*c* (referred to collectively as the receptacles 120, and generically as a receptacle 120). The rack 208 can be configured to accommodate three small receptacles 120*a*, or two medium receptacles 120*b*, or a single large receptacle 120*c*. As will be apparent, the rack 208 may also accommodate other combinations of receptacles, such as one medium receptacle 120*b* and two small receptacles 120*a*. The receptacles 120 available in the facility 100 need not be constrained to the three types shown in FIG. 2. More generally, the set of receptacles 120 installed on a given transporter 116 can change over time, to accommodate different sets of items to be collected by the transporter 116 in the course of order fulfillment.

The transporter 116 can also include an output device, such as a display 212. In the illustrated example, the display 212 is mounted above the rack 208, but it will be apparent that the display 212 can be disposed elsewhere on the transporter in other examples. Further, the transporter 116 can include other output devices, in addition to or instead of the display 212. For example, the transporter 116 can include one or more speakers, light emitters such as strips of light-emitting diodes (LEDs) along the height of the rack 208, and the like.

The chassis 200 of the transporter 116 also supports various other components, including a processor 216, e.g., in the form of one or more central processing units (CPU), graphics processing units (GPU), or dedicated hardware controllers such as application-specific integrated circuits (ASICs). The processor 216 is communicatively coupled with a memory 220, e.g., a suitable combination of volatile and non-volatile memory elements. The processor 216 is also coupled with a communications interface 224, such as a wireless transceiver enabling the transporter 116 to communicate with other computing devices, such as the server 128.

The memory 220 stores various data used for autonomous or semi-autonomous navigation, including an application 228 executable by the processor 216 to implement navigational and other order fulfillment functions. In some examples, the above functions can be implemented via multiple distinct applications stored in the memory 220.

The chassis 200 can also supports a sensor 232, such as one or more cameras and/or depth sensors (e.g., lidars, depth cameras, or the like) coupled with the processor 216. The sensor 232 is configured to capture image and/or depth data depicting at least a portion of the physical environment of the transporter 116 for navigational purposes, e.g., path planning, obstacle avoidance, and the like. The transporter 116 can also include a wide variety of other sensor hardware in some examples, in addition to or instead of the above-mentioned cameras and/or depth cameras. For example, the transporter 116 can include sensors configured to detect the items 104, such as load sensors integrated with the rack 208, radio frequency identification (RFID) scanners configured to detect tags affixed to the items 104, barcode scanners, and the like.

Turning to FIG. 3, certain internal components of the server 128 are illustrated. The server 128, in particular, includes a processor 300, e.g., in the form of one or more central processing units (CPU), graphics processing units (GPU), or dedicated hardware controllers such as application-specific integrated circuits (ASICs). The processor 300 is communicatively coupled with a memory 304, e.g., a suitable combination of volatile and non-volatile memory elements. The processor 300 is also coupled with a communications interface 308, such as a network interface controller (NIC) enabling the server 128 to communicate with other computing devices, such as the mobile robot 116, client devices 140, and the like.

The memory 304 can store the repository 132 mentioned earlier, as well as a fleet control application 312 whose execution by the processor 300 configures the processor 300 to implement various functions related to the fulfillment of orders within the facility 100, by deploying the transporters 116 as described in detail below. The server 128, as configured via execution of the application 312, can also be referred to as a picking execution system. As noted earlier, in other examples, the repository 132 can be stored at a distinct computing device and accessed by the server 128, and/or divided into multiple separate repositories.

Figure 4:
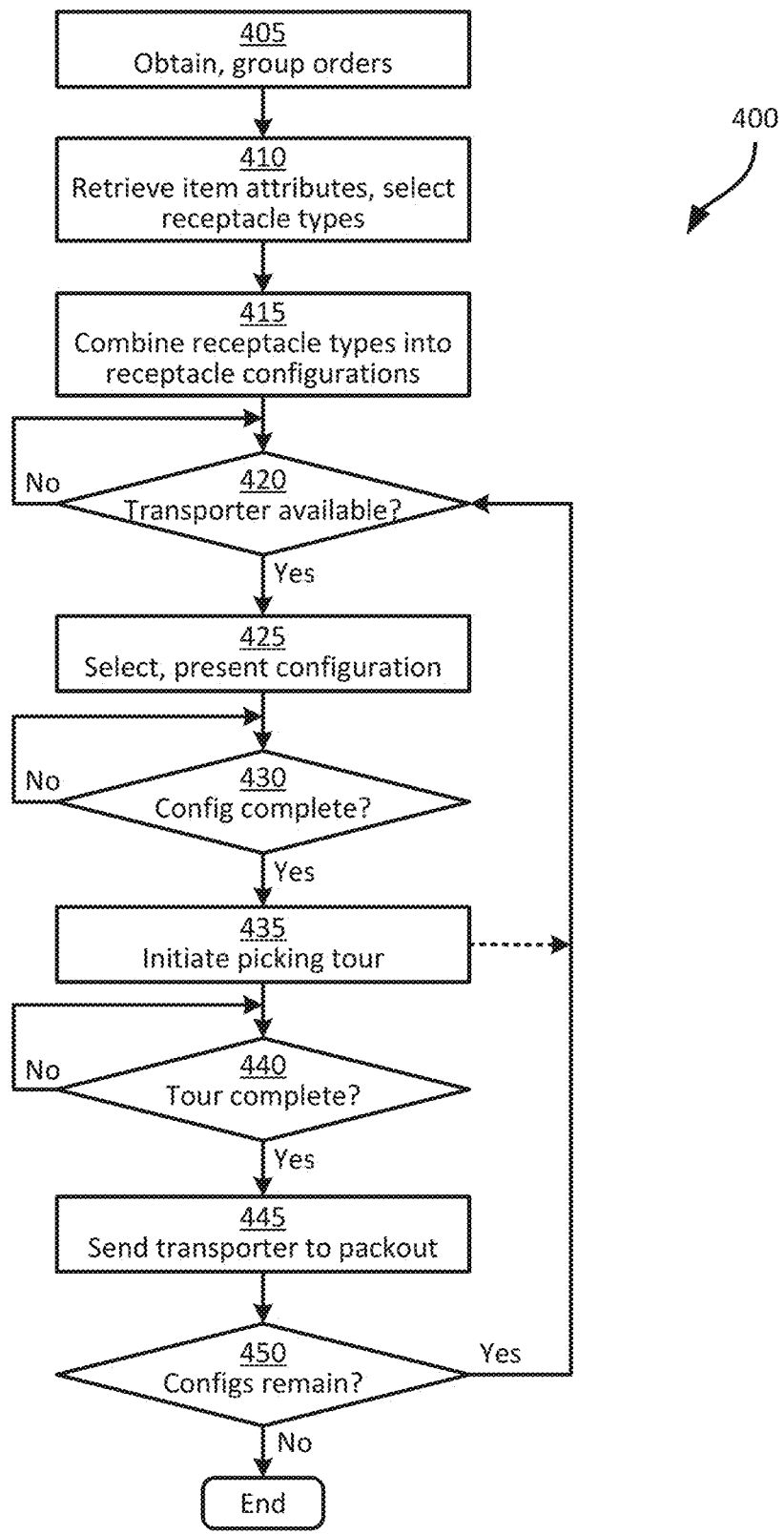
FIG. 4 is a flowchart illustrating a method of fleet control for order fulfillment.

Turning to FIG. 4, a method 400 of automated unit load fulfillment is illustrated. The performance of the method 400 will be described below in conjunction with its performance in the facility 100, and in particular by the server 128, via application of the application 312 by the processor 300. In general, performance of the method 400 by the server 128 enables the server 128 to automatically allocate orders for items 104 to a fleet of transporters 116 in the facility 100, optimizing various metrics such as the distance traveled by the transporters 116, congestion in the facility 100 resulting from activity of the transporters 116 and the workers 112, utilization of the workers 112, and the like.

At block 405, the server 128 is configured to obtain a batch (also referred to as a wave) of item group definitions. For example, the server 128 can be configured to obtain the item group definitions by obtaining a plurality of orders, and generating the item group definitions from the orders. An order, as will be apparent to those skilled in the art, is a set of at least one item 104 to be retrieved from the support structures 108 and packaged for delivery to a customer, further facility, retailer, or the like. The mechanism by which orders are obtained at the server 128 is beyond the scope of this discussion, and various such mechanisms will occur to those skilled in the art.

Each order includes an order identifier sufficiently unique to distinguish the order from others. Each order also includes a set of item identifiers, indicating which items 104 are to be collected to fulfill the order, as well as quantity indicators specifying how many instances of each item 104 are to be collected. In some examples, item group definitions are equivalent to orders. In other examples, however, the server 128 can be configured to generate item group definitions that encompass multiple orders under certain conditions. Specifically, the server 128 can be configured to detect single-item orders (i.e., orders that contain only one item identifier, regardless of the specified quantity), and to combine single-item orders with matching item identifiers into a single item group definition.

Figure 5:
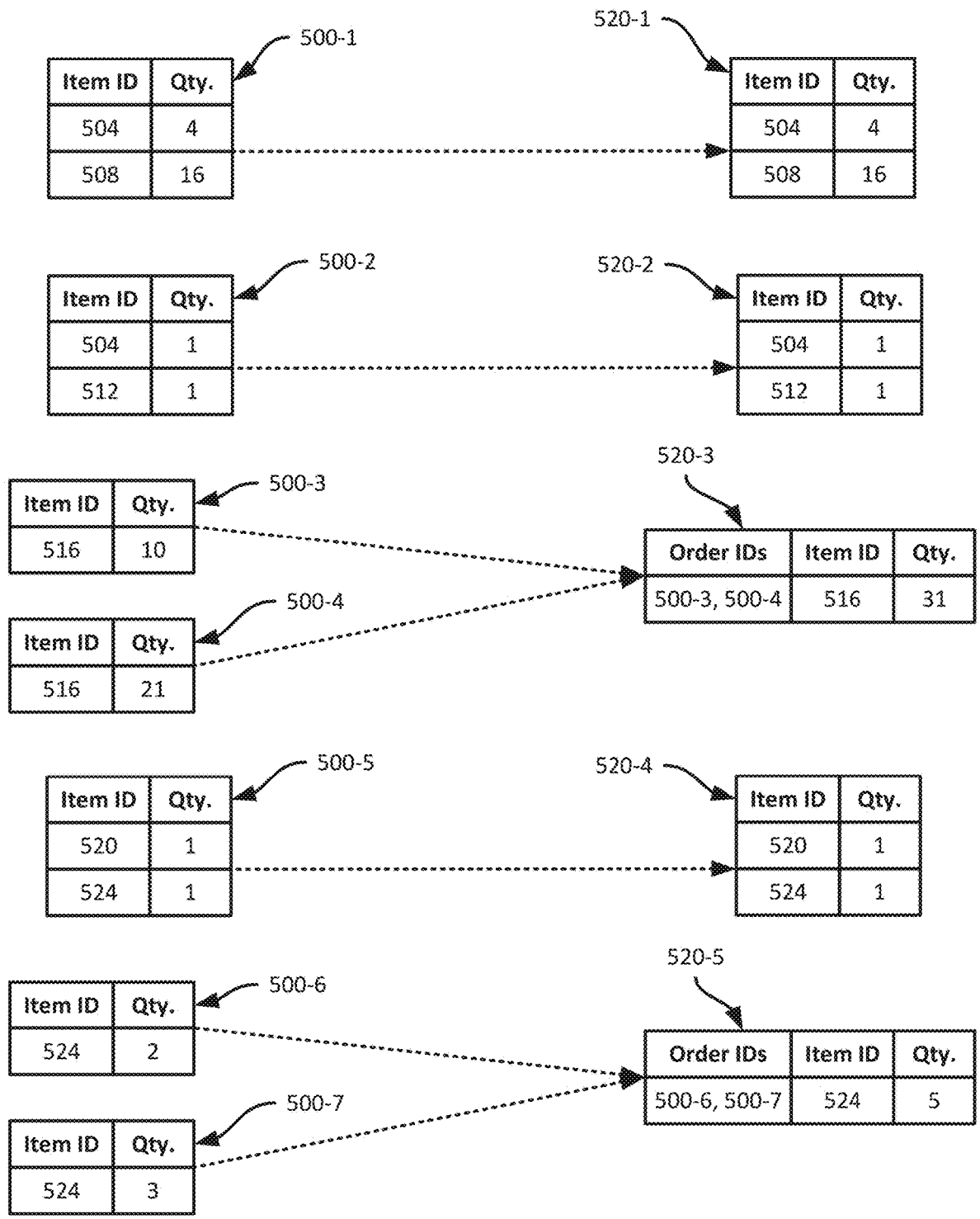
FIG. 5 is a diagram illustrating an example performance of block 405 of the method of FIG. 4

Turning to FIG. 5, an example generation of item group definitions is illustrated schematically. In the illustrated example, the server 128 receives a set of orders 500-1, 500-2, 500-3, 500-4, 500-5, 500-6, and 500-7 (collectively, the orders 500, and generically, an order 500). As will be apparent, the number of orders received at the server 128 can be significantly higher (e.g., in the hundreds or thousands) than the number illustrated. The orders 500 can, in some examples, have been previously selected (e.g., by the server 128) from a superset of orders received at the server 128 from external entities (e.g., customers, retailers, or the like). Selection from such a superset can be performed based on a predefined parameter (which may also be referred to as a management system parameter), such as a time window. The time window can be, for example, a one-day period, a shift (e.g., of eight hours, or the like), or other suitable window. In other words, the server 128 can be configured to generate item group definitions for orders expected to be fulfilled in the time window mentioned above. Other orders can be processed subsequently, in a separate performance of the method 400.

As seen in FIG. 5, each order 500 identifies one or more items 104, as well as quantities of such items 104. Some orders identify the same items, but also identify other items. For example, the orders 500-1 and 500-2 both contain the item identifier 504, but the order 500-1 also contains the item identifier 508, while the order 500-2 contains the item identifier 512. Such orders are also referred to as multi-item orders, and the server 128 is configured to generate distinct item group definitions for each multi-item order, regardless of overlapping item identifiers within such orders. Thus, as shown in FIG. 5, the server 128 generates item group definitions 520-1 and 520-2 corresponding to the orders 500-1 and 500-2. The item group definitions 520 can also include the order identifiers ("500-1" and "500-2"), in some examples.

The orders 500-3 and 500-4, in contrast to the orders 500-1 and 500-2, each contain only a single item identifier (the item identifier 516). Further, the orders 500-3 and 500-4 contain the same item identifier, and are therefore referred to as single-item orders. The server 128 can be configured to generate a single item group definition for all single-item orders 500 containing the same item identifier, by combining the quantities from the relevant orders 500. The server 128 can therefore generate an item group definition 520-3 that contains the item identifier 516, and the combined quantity from the orders 500-3 and 500-4. The order identifiers "500-3" and "500-4" can also be included in the item group definition 520-3. In other examples, the specific quantities from each order can also be specified in the item group definition 520-3. As will be apparent in the discussion below, each of the item group definitions 520 is to be assigned to a single receptacle 120. Thus, single-item orders may be collected by the transporter 116 collectively, as a single virtual order (in a single receptacle 120). The single-item orders can then be separated according to the orders 500 themselves at a packout location in the facility 100. Combination of single-item orders enables increased efficiency in order fulfillment, as the combination avoids the need to devote a separate receptacle 120 to each individual order.

In addition to the above, the server 128 generates an item group definition 520-4 consisting solely of the order 500-5, as the order 500-5 is also a multi-item order. Finally, the server 128 generates a single item group definition 520-5 by combining the orders 500-6 and 500-7, which are both single-item orders containing matching item identifiers.

Returning to FIG. 4, having obtained item group definitions at block 405, the server 128 is configured to assign sets of item group definitions to respective receptacle configurations, via the performance of blocks 410 and 415. One receptacle configuration indicates a set of receptacles 120 to be installed on the rack 208 of a single transporter 116, and identifies which receptacle types (e.g., from the receptacles 120a, 120b, and 120c noted earlier) are to be so installed. Therefore, a given set of item group definitions is assigned to a receptacle configuration having the same number of receptacles 120 as there are item group definitions in the set. The set can include as few as one item group definitions.

The assignment of item group definitions to receptacle configurations is based on item attributes, including the locations and dimensional attributes of the items 104 identified in the item group definitions. Various mechanisms for assigning sets of item group definitions to receptacle configurations are contemplated, additional examples of which will be apparent to those skilled in the art based on the discussion of certain examples below.

At block 410, the server 128 is configured to retrieve attributes from the repository 132 for each item 104 identified in the item group definitions 520 generated or otherwise obtained at block 405. The attributes retrieved at block 410 include at least dimensional attributes of the relevant items 104. Dimensional attributes can include any one or more of a linear dimension of the relevant item type, a volume, a mass, or the like. The attributes retrieved at block 410 can also include locations of the items 104 within the facility 100, e.g., in the form of coordinates in a previously established coordinate system in the facility 100, an identifier of a particular support structure 108 such as a shelf module 108, or the like.

Figure 6:
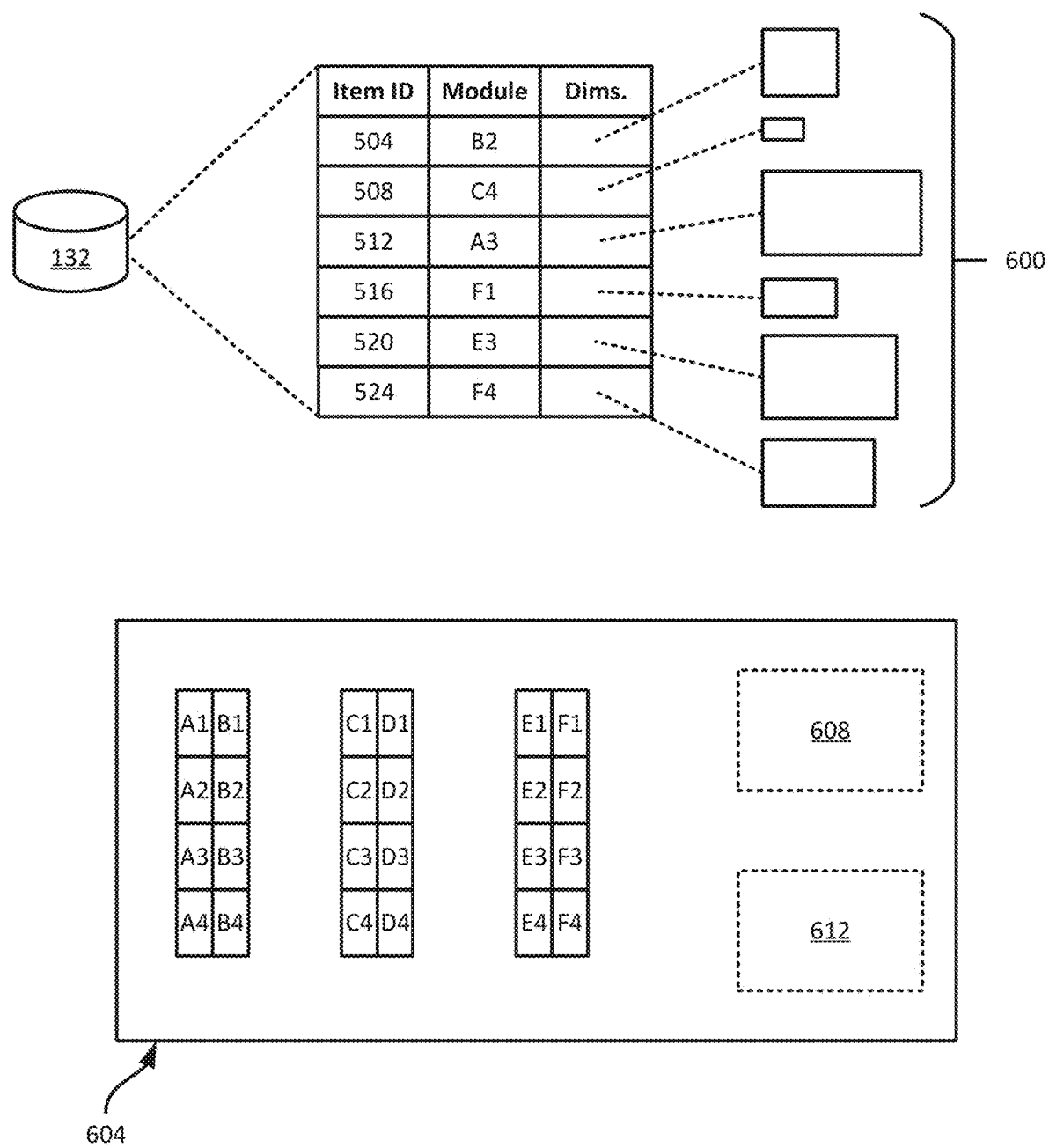
FIG. 6 is a diagram illustrating an example retrieval of item attributes at block 410 of the method of FIG. 4.

FIG. 6 illustrates example dimensional and location attributes retrieved at block 410 for the items 104 identified in the item groups shown in FIG. 5. In particular, the server 128 is configured to query the repository 132 for the above attributes for each of the item identifiers 504, 508, 512, 516, 520, and 524. The retrieved attributes include dimensional attributes 600, which are represented graphically in FIG. 6 but can be stored in the repository 132 as numerical values, include linear dimensions (e.g., any combination of length, width, and/or depth) in the present example, illustrated as two-dimensional profiles for simplicity. The retrieved attributes also include locations, in the form of shelf module identifiers. A map 604 of the facility 100 is also shown in FIG. 6, indicating the location of each of a plurality of shelf modules, which are arranged into aisles. Also shown in the map 604 are a staging area 608 where transporters 116 can be prepared for picking tours (e.g., fitted with receptacles 120), and a packout area 612 where receptacles 120, containing items 104, are removed from the transporters 116 for packaging and shipping.

Figure 7:
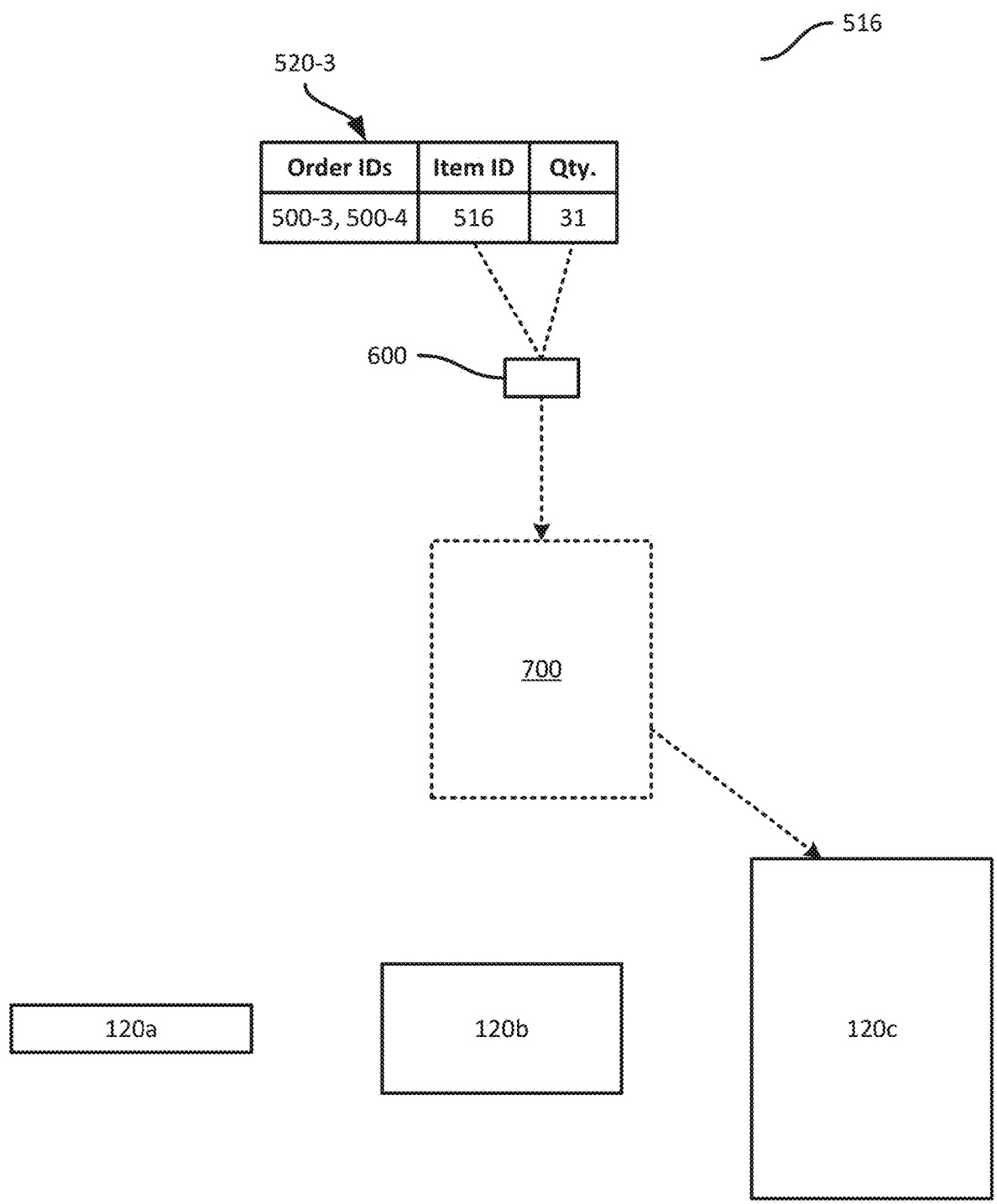
FIG. 7 is a diagram illustrating an example selection of receptacle types at block 410 of the method of FIG. 4.

At block 410 the server 128 can also be configured, having retrieved the above-noted item attributes, to select a receptacle type for each item group definition. In particular, turning to FIG. 7, the server 128 can be configured to generate a group dimensional attribute for each item group definition, e.g., based on the dimensional attributes and quantities of the corresponding items 104 identified in the item group definition. As shown in FIG. 7, for example, for the item group definition 520-3, the dimensional attribute(s) 600 corresponding to the item identifier 516, along with the quantity of that item, are employed by the server 128 to generate a group dimensional attribute 700, such as an aggregated volume estimate for the specified thirty-one instances of the item corresponding to the item identifier 516.

Having generated the group dimensional attribute, the server 128 is configured to select from a set of predefined receptacle types, such as the receptacles 120a, 120b, and 120c noted earlier. Dimensional attributes, such as a volume, are stored in the repository 132 for each receptacle type, and the server 128 can therefore be configured to select the receptacle type having the smallest volume (or other suitable dimensional attribute) that exceeds the group dimensional attribute 700. As shown in FIG. 7, the group dimensional attribute 700 indicates that the items of the group definition 520-3 are likely unable to be accommodated in the receptacle types 120a and 120b, and the server 128 therefore selects the receptacle type 120c at block 410. The above process can then be repeated for each remaining item group definition 520.

Referring again to FIG. 4, at block 415 the server 128 is configured to combine the receptacle types from block 410 into receptacle configurations. In other words, the server 128 determines at block 410 which item group definitions 520 are to be collected by the same transporter 116. The combination at block 415 can be based on the item locations retrieved at block 410 (e.g., as illustrated in FIG. 6), and seeks to optimize one or more performance metrics associated with the fulfillment of the orders 500. For example, the server 128 can be configured to select combinations of item group definitions 520 (and their corresponding receptacle types as selected at block 410) to minimize the total travel distance involved in fulfilling all orders 500 represented by the item group definitions 520. Various optimization mechanisms will occur to those skilled in the art, including mechanisms based, for example, on a connected graph representing paths through the facility 100, with nodes indicating the locations of each shelf module. Estimated travel distance to collect a particular set of items 104 may be determined using such a graph, and used to select combinations of item group definitions at block 415.

For instance, in some implementations the server 128 can be configured to generate candidate sets of item group definitions (e.g., a first candidate set including the group definitions 520-1 and 520-2, a second candidate set including the group definitions 520-1 and 520-3, and so on). The server 128 can then be configured to assess a proximity metric for each candidate set. The proximity metric can include an estimated travel distance from the staging area 608, to each item location corresponding to the items in the set, and then to the packout area 612. In other examples, the proximity metric can include a count of item locations in one item group definition that coincide or are otherwise adjacent to item locations in the other item group definition(s) in the set. For instance, the group item definitions 520-1 and 520-2 both contain the item identifier 504, and thus both require a transporter 116 to visit the same location. Placing the item group definitions 520-1 and 520-2 on the same transporter 116 may therefore be an efficient use of that transporter 116.

The characteristics of the receptacle types 120 themselves can be employed as constraints in the performance of block 415. For example, the receptacle type 120c is sufficiently large that when a receptacle of the type 120c is placed on a transporter 116, no further receptacles 120 can be placed on that transporter 116. Thus, any item group definitions associated with the receptacle type 120c at block 410 are assigned to receptacle configurations that include only one receptacle of the type 120c.

Figure 8:
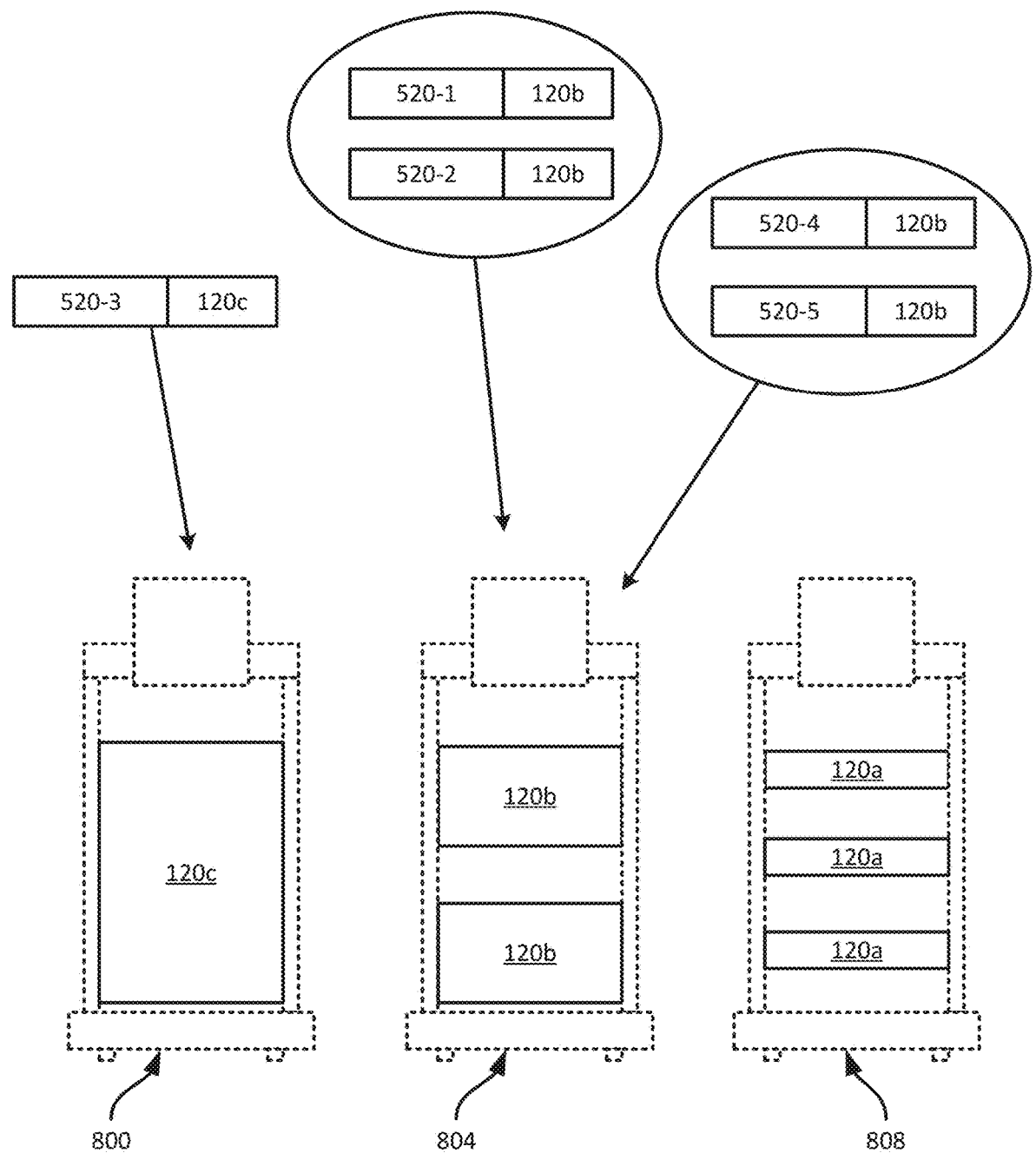
FIG. 8 is a diagram illustrating an example performance of block 415 of the method of FIG. 4.

In some examples, as shown in FIG. 8, the server 128 maintains a set of predefined receptacle configurations 800, 804, and 808. As illustrated, the configuration 800 contains a single receptacle 120c, the configuration 804 contains two receptacles 120b, and the configuration 808 contains three receptacles 120a. A wide variety of other configurations can also be predefined, in other examples. When such predefined configurations are employed, any combinations selected at block 415 are restricted to those predefined configurations. In this example, therefore, the item group definition 520-3 is necessarily associated, alone, with the configuration 800, and the remaining item group definitions 520 are necessarily associated with the configuration 804.

To determine which pairs of the item group definitions 520-1, 520-2, 520-4, and 520-4 to combine with one another, the server 128 can determine, for example, that the item group definitions 520-1 and 520-2 share an item identifier, as do the item group definitions 520-4 and 520-5. The item group definitions 520-1 and 520-2 are therefore associated together with the configuration 804. The item group definitions 520-4 and 520-5 are also associated together with the configuration 804.

Returning to FIG. 4, following the performance of block 415, each item group definition from block 405 has been assigned to a receptacle type, as well as to a receptacle configuration that may associate the item group definition with one or more other item group definitions. At block 420 the server 128 is configured to determine whether a transporter 116 is available. The performance of block 420 need not immediately follow the performance of block 415. For example, item group definitions and receptacle configurations may be generated prior to the period of time in which the corresponding orders 500 are expected to be fulfilled.

The server 128 is configured to monitor the availability of the fleet of transporters 116 in the facility 100. Availability can include, as noted earlier, an indication that a transporter 116 is not currently handling any order fulfillment operations. The availability of transporter 116 can be reported explicitly to the server 128, e.g., upon arrival of a transporter at the packout are 612 following completion of a picking tour. In other examples, availability can be derived from a current location of the transporter 116, e.g., if the transporter 116 is idle in the staging area 608 for a threshold period of time.

When the determination at block 420 is negative, the server 128 can be configured to await an available transport 116. When the determination at block 420 is affirmative, the server 128 proceeds to block 425. At block 425, the server 128 is configured to select one of the receptacle configurations from block 415, and to present the selected receptacle configuration via an output device (e.g., the display 212 of the available transporter 116). Presentation of the selected receptacle configuration serves to initiate placement of receptacles 120 onto the rack 208 of the transporter 116, according to the selected receptacle configuration.

As will be apparent, the transporters 116, being reconfigurable, are interchangeable, and which transporter 116 has become available therefore does not impact the selection of a receptacle configuration. The server 128 can, instead, select a receptacle configuration at block 425 based on urgency metrics, congestion metrics, or the like. For example, each order 500 can be stored in association with an urgency level, an expected departure time (e.g., corresponding to the departure of a vehicle from the facility 100 that is expected to carry the relevant order 500), or the like. When selecting receptacle configurations at block 425, the server 128 can therefore be configured to select the receptacle configuration associated with the most urgent order 500.

In other examples, instead of or in addition to urgency-based dispatch of transporters 116, the server 128 can be configured to select a receptacle configuration to mitigate congestion in the facility 100. For example, the server 128 can determine which locations in the facility 100 are to be visited by transporters actively fulfilling orders 500 (i.e., having already been assigned receptacle configurations). The server 128 can then select a receptacle configuration at block 425 that does not visit those locations. In other examples, the server 128 can select receptacle configurations at block 425 to avoid having more than a threshold number of active transporters 116 expected to visit any given location in the facility 100. In further examples, the server 128 can select receptacle configurations to direct a transporter 116 to areas of the facility that are not expected to be visited by other active transporters 116 (e.g., to reduce idle time for workers 112 in those areas).

In further examples, the server 128 can select receptacle configurations based at least in part on stock levels of the items 104 in the facility 100 (which can also be represented in the repository 132). For example, the server 128 can restrict the selection of receptacle configurations at block 425 to those referring to items with at least a threshold stock level (e.g., at least sufficient stock to fulfill the underlying orders 500).

Figure 9:
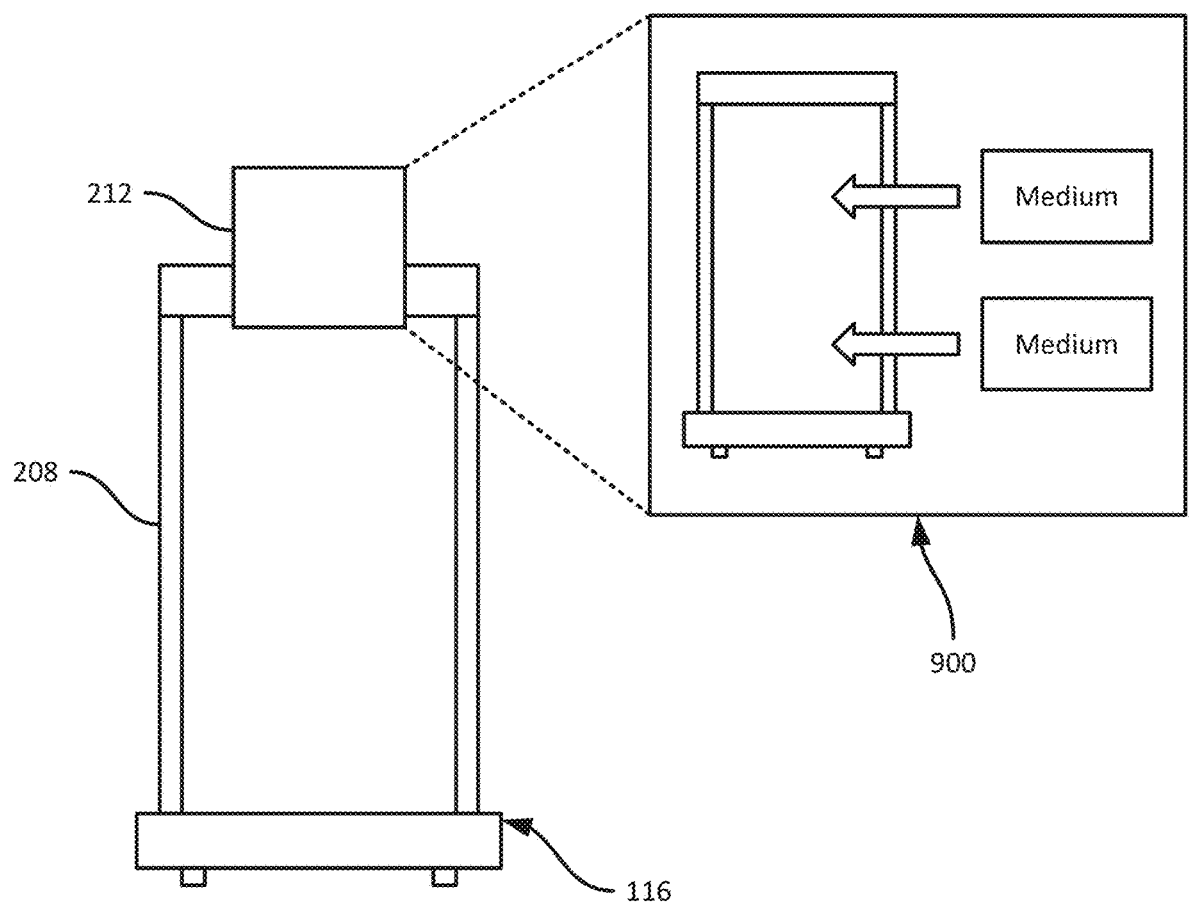
FIG. 9 is a diagram illustrating an example performance of block 425 of the method of FIG. 4.

In response to selection of a receptacle configuration, the server 128 is configured to transmit the selected receptacle configuration for presentation at an output device, such as the display 212 of the available transporter 116, a client device 140 of a worker in the staging area 608, or the like. The presentation of the selected configuration provides visual and/or audible guidance to workers in the staging area 608 to place receptacles 120 on the available transporter 116, according to the selected configuration. Turning to FIG. 9, a transporter 116 is illustrated following receipt of the selected receptacle configuration from the server 128. The transporter 116 is configured, in response, to render the receptacle configuration on the display 212, e.g., in the form of a graphical interface 900 illustrating the number and type of receptacles to be placed on the rack 208 of the transporter 116.

At block 430, the server 128 is configured to determine whether configuration of the available transporter 116 identified at block 420 is complete. That is, the server 128 is configured to determine whether the required receptacles 120, according to the selected configuration from block 425, have been placed on the transporter 116. The determination at block 430, in the present example, is based on the receipt of receptacle identifiers from either or both of the transporter 116 itself, and a client device 140 operated by a worker 112 in the staging area 608.

Figure 10:
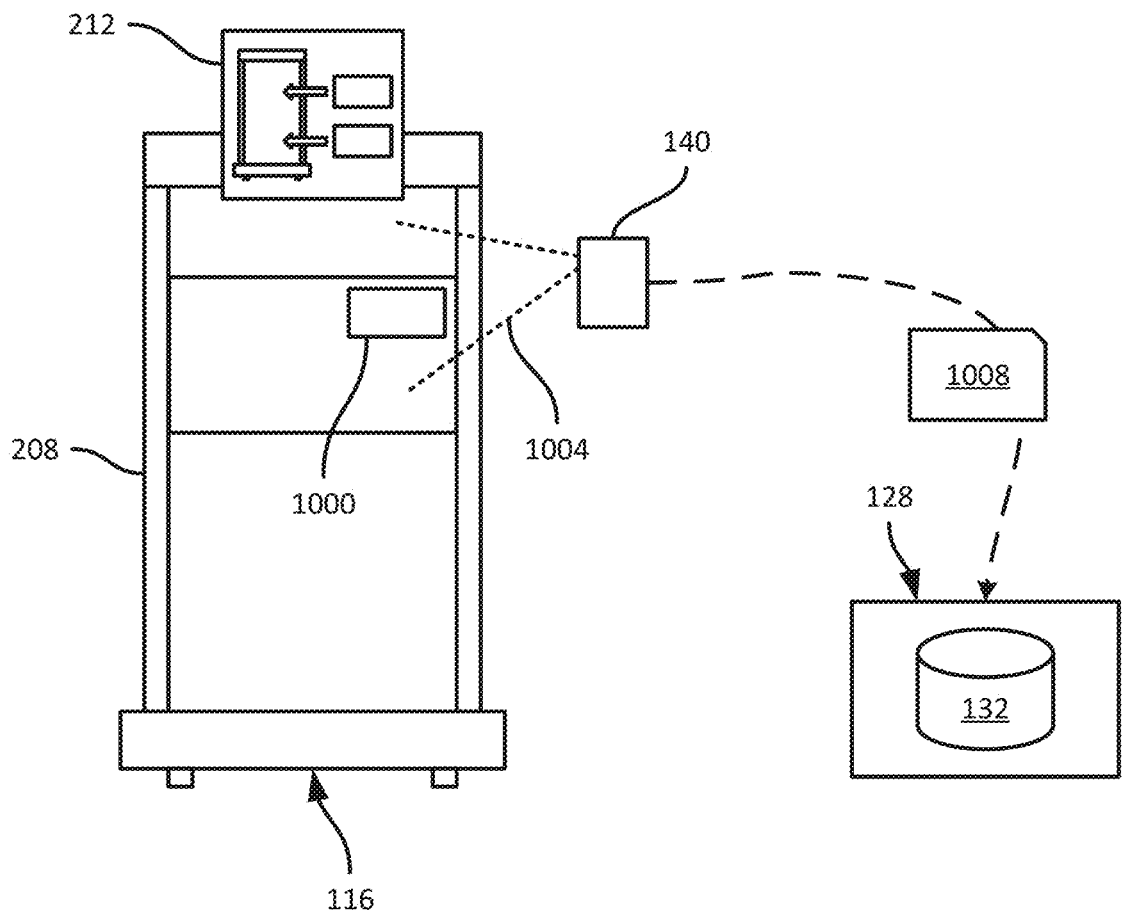
FIG. 10 is a diagram illustrating an example performance of block 430 of the method of FIG. 4.

As shown in FIG. 10, which illustrates an example staging process for a transporter 116, each receptacle 120 can include an identifier displayed thereon, e.g., on a label 1000 or the like. The identifier can be encoded in a machine-readable indicium such as a barcode and/or radio frequency identification (RFID) tag, displayed in plain text, or the like. Upon placement of a receptacle 120 on the rack 208 of a transporter 116 according to the configuration presented at block 425, a client device 140 can be operated to capture the identifier of the receptacle and transmit the identifier to the server 128. The client device 140 can, for example, include a camera, barcode scanner, or other sensor with a field of view 1004 that can be positioned to encompass the label 1000 in order to capture the receptacle identifier. In other examples, the identifier can be input at the client device 140 manually, by an operator of the client device 140. In further examples, the receptacle identifier can be input at the transporter 116 itself, e.g., via a touch screen integrated with the display 212, or via detection of the label 1000 by a sensor of the transporter 116, such as an RFID sensor, a barcode scanner, or the like.

In the illustrated example, having captured the receptacle identifier, the client device 140 is configured to transmit a message 1008 to the server 128 including at least the receptacle identifier. In some examples, the message 1008 also includes an identifier of the transporter 116 itself, enabling the server 128 to associate the specific transporter 116, as well as the specific receptacle 120 identified in the message 1008, with the receptacle configuration (and therefore with the associated item group definitions) selected at block 425. The server 128 can therefore verify that the receptacle 120 placed on the transporter 116 is of the correct type, and can generate a notification if the incorrect receptacle type has been installed. The server 128 can further determine whether any receptacles remain to be placed, according to the selected receptacle configuration. When one or more receptacles remain to be placed (as is the case in FIG. 10) the server 128 awaits further confirmation messages such as the message 1008, in a further performance of block 430. When, on the other hand, all expected receptacles 120 have been placed on the transporter 116, the determination at block 430 is affirmative, and the server 128 proceeds to block 435.

At block 435, the server 128 can transmit an instruction to the transporter 116, now equipped with a set of receptacles 120, to begin a picking tour, traveling through the facility 100 to the locations corresponding to the items identified in the item group definitions associated with the selected receptacle configuration from block 425. Control of the transporter 116 during the picking tour can be effected according to a wide variety of mechanisms, as will be apparent to those skilled in the art. For example, the server 128 can transmit the relevant item locations to the transporter 116, which can in turn be configured to plan a path through the facility that traverses each location while minimizing total travel distance. In other examples, the server 128 itself can generate the above-mentioned path.

Upon arrival of the transporter 116 at each location, the transporter and/or the server 128 can present information instructing a worker 112 at the location to pick the relevant item(s) to one of the receptacles 120 on the transporter 116. For example, the display 212 of the transporter 116 can be controlled to present an interface identifying an item type and quantity, as well as a receptacle into which that quantity of the item are to be placed. Placement of the item(s) have been placed in the receptacle can be detected at the server 128 in response to scanning of item identifiers by a client device 140, provision of input at the client device 140 or the transporter 116 by a worker 112, or the like. Upon completion of a pick operation, the transporter 116 can be controlled, e.g., via an instruction from the server 128, to proceed to the next location.

At block 435, the server 128 can also, in parallel with the remainder of the method 400, initiate a further performance of block 420. That is, the server 128 can continue to assign receptacle configurations to transporters 116, when transporters 116 become available, while other transporters are engaged in fulfilling previously assigned orders.

At block 440, the server 128 is configured to determine whether the picking tour initiated at block 435 is complete. For example, the server 128 can determine whether pick confirmations have been received for each item type specified in the item group definitions assigned to the transporter 116. When such confirmations have been received, the determination at block 440 is affirmative. Under certain conditions, the determination at block 440 may be affirmative despite some pick operations remaining incomplete. For example, when an item 104 identified in an item group definition is out of stock, a client device 140 and/or an input device at the transporter 116 can be operated by a worker 112 to notify the server 128 that an order 500 cannot currently be completed. If all remaining orders 500 assigned to the transporter 116 are complete, the server 128 may determine that the tour of that transporter 116 is complete at block 440.

Following an affirmative determination at block 440, the server 128 can instruct the transporter 116 to travel to the packout area 612 of the facility 100 (or another suitable area), for removal of the receptacles 120 from the transporter 116, and packaging of the underlying orders 500. In some examples, e.g., when an exception such as the out-of-stock scenario set out above was encountered during the picking tour, the server 128 can direct the transporter 116 to a distinct area of the facility 100, e.g., for partial packout and remediation of the incomplete order(s).

At block 450, the server 128 is configured to determine whether receptacle configurations remain to be assigned to transporters 116. When the determination is affirmative at block 450, the server 128 returns to block 420 to await an available transporter 116. When the determination at block 450 is negative, performance of the method 400 ends.

Various enhancements to the above processes are also contemplated. For example, the server 128 can be configured, in some implementations, to dynamically adjust receptacle configurations, even after assignment to transporters at block 425. For example, during a picking tour by a given transporter 116, the server 128 may receive a notification that an item 104 is out of stock. If an order 500 encompassed by the receptacle configuration assigned to that transporter 116 includes the out-of-stock item, but no picks have yet been completed for that order 500 (i.e., the corresponding receptacle 120 remains empty), the server 128 can dynamically modify the receptacle configuration to delete the corresponding order 500 therefrom, e.g., substituting an order 500 from another receptacle configuration that has not yet been assigned to a transporter 116.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

Certain expressions may be employed herein to list combinations of elements. Examples of such expressions include: "at least one of A, B, and C"; "one or more of A, B, and C"; "at least one of A, B, or C"; "one or more of A, B, or C". Unless expressly indicated otherwise, the above expressions encompass any combination of A and/or B and/or C.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method, comprising:
   obtaining a batch of item group definitions, each item group definition having one or more item identifiers and corresponding quantities;
   for each item identifier, retrieving (i) a location of a corresponding item in a facility, and (ii) a dimensional attribute of the corresponding item;
   based on the locations and dimensional attributes, assigning sets of the item group definitions to respective receptacle configurations, each receptacle configuration including, for each item group definition in the set, a receptacle type with a predefined capacity;
   monitoring availability of a plurality of transporters in the facility, each transporter having a chassis configured to support a selectable set of receptacles; and
   responsive to detecting that a transporter is available, selecting one of the receptacle configurations, and presenting the selected receptacle configuration via an output device, to initiate placement of receptacles onto the chassis of the transporter according to the selected receptacle configuration.

2. The method of claim 1, further comprising:
   detecting that placement of the receptacles onto the chassis of the transporter is complete; and
   controlling the transporter to initiate travel in the facility to collect items identified in the set of item group definitions assigned to the selected receptacle configuration.

3. The method of claim 2, further comprising:
   detecting that collection of the items identified in the set of item group definitions assigned to the selected receptacle configuration is complete; and
   controlling the transporter to travel to a packout location in the facility for removal of the receptacles.

4. The method of claim 2, wherein the detecting includes: receiving, from a client computing device, a set of receptacle identifiers complying with the selected receptacle configuration.

5. The method of claim 1, further comprising:
   obtaining a plurality of orders, each containing one or more item identifiers and corresponding quantities; and
   selecting a portion of the orders, based on a time window; and
   generating the batch of item group definitions from the selected portion of the orders.

6. The method of claim 1, further comprising:
   obtaining a plurality of orders, each containing one or more item identifiers and corresponding quantities;
   generating a corresponding item group definition for each order containing multiple item identifiers;
   identifying a set of orders containing single item identifiers; and
   generating a single item group definition for the set of orders, the single item group definition having a quantity equal to the sum of the quantities from the set of orders.

7. The method of claim 1, wherein the dimensional attribute for each item includes at least one of (i) a volume, (ii) a linear dimension, or (iii) a mass.

8. The method of claim 1, further comprising selecting the receptacle type by:
   for each item group definition, generating a group dimensional attribute, based on the dimensional attributes and quantities of the corresponding items; and
   selecting the receptacle type based on comparison between capacities and group dimensional attribute.

9. The method of claim 1, wherein assigning sets of the item group definitions to respective receptacle configurations includes:
   associating each item group definition with one of a plurality of receptacle types having respective capacities, based on a comparison of the dimensional attributes with the capacities; and
   combining receptacle types and associated item group definitions into the receptacle configurations.

10. The method of claim 9, wherein combining receptacle types and associated item group definitions into the receptacle configurations includes:
    combining item group definitions based on a proximity metric derived from the locations of the corresponding items.

11. The method of claim 9, wherein combining receptacle types and associated item group definitions into the receptacle configurations includes: combining the receptacle types according to preconfigured combinations of receptacle types.

12. The method of claim 1, wherein presenting the selected receptacle configuration includes: causing the transporter to render the selected receptacle configuration on a display of the transporter.

13. The method of claim 1, wherein selecting one of the receptacle configurations is based on at least one of: (i) priority levels associated with each receptacle configuration, or (ii) a congestion metric associated with at least one location in the facility.

14. A computing device, comprising:
    a communications interface;
    a memory; and
    a processor configured to:
      obtain a batch of item group definitions, each item group definition having one or more item identifiers and corresponding quantities;
      for each item identifier, retrieve (i) a location of a corresponding item in a facility, and (ii) a dimensional attribute of the corresponding item;
      based on the locations and dimensional attributes, assign sets of the item group definitions to respective receptacle configurations, each receptacle configuration including, for each item group definition in the set, a receptacle type with a predefined capacity;
      monitor availability of a plurality of transporters in the facility, each transporter having a chassis configured to support a selectable set of receptacles; and
      responsive to detecting that a transporter is available, select one of the receptacle configurations, and present the selected receptacle configuration via an output device, to initiate placement of receptacles onto the chassis of the transporter according to the selected receptacle configuration.

15. The computing device of claim 14, wherein the processor is further configured to:
    detect that placement of the receptacles onto the chassis of the transporter is complete; and control the transporter to initiate travel in the facility to collect items identified in the set of item group definitions assigned to the selected receptacle configuration.

16. The computing device of claim 15, wherein the processor is further configured to:
detect that collection of the items identified in the set of item group definitions assigned to the selected receptacle configuration is complete; and
control the transporter to travel to a packout location in the facility for removal of the receptacles.

17. The computing device of claim 15, wherein the processor is further configured, to detect that placement of the receptacles is complete, to: receive, from a client computing device, a set of receptacle identifiers complying with the selected receptacle configuration.

18. The computing device of claim 14, wherein the processor is further configured to:
obtain a plurality of orders, each containing one or more item identifiers and corresponding quantities; and
select a portion of the orders, based on a time window; and
generate the batch of item group definitions from the selected portion of the orders.

19. The computing device of claim 14, wherein the processor is further configured to:
obtain a plurality of orders, each containing one or more item identifiers and corresponding quantities;
generate a corresponding item group definition for each order containing multiple item identifiers;
identify a set of orders containing single item identifiers; and
generate a single item group definition for the set of orders, the single item group definition having a quantity equal to the sum of the quantities from the set of orders.

20. The computing device of claim 14, wherein the dimensional attribute for each item includes at least one of (i) a volume, (ii) a linear dimension, or (iii) a mass.

21. The computing device of claim 14, wherein the processor is further configured, to select the receptacle type, to:
for each item group definition, generate a group dimensional attribute, based on the dimensional attributes and quantities of the corresponding items; and
select the receptacle type based on comparison between capacities and group dimensional attribute.

22. The computing device of claim 14, wherein the processor is further configured, to assign sets of the item group definitions to respective receptacle configurations, to:
associate each item group definition with one of a plurality of receptacle types having respective capacities, based on a comparison of the dimensional attributes with the capacities; and
combine receptacle types and associated item group definitions into the receptacle configurations.

23. The computing device of claim 22, wherein the processor is further configured, to combine receptacle types and associated item group definitions into the receptacle configurations, to: combine item group definitions based on a proximity metric derived from the locations of the corresponding items.

24. The computing device of claim 22, wherein the processor is further configured, to combine receptacle types and associated item group definitions into the receptacle configurations, to: combine the receptacle types according to preconfigured combinations of receptacle types.

25. The computing device of claim 14, wherein the processor is further configured, to present the selected receptacle configuration, to: cause the transporter to render the selected receptacle configuration on a display of the transporter.

26. The computing device of claim 14, wherein the processor is further configured to select one of the receptacle configurations based on at least one of: (i) priority levels associated with each receptacle configuration, or (ii) a congestion metric associated with at least one location in the facility.

* * * * *